Feb. 8, 1955 H. M. MITCHELL 2,701,441
PRESSURIZED FEED FOR JET PROPULSION SYSTEMS
Filed Jan. 18, 1950
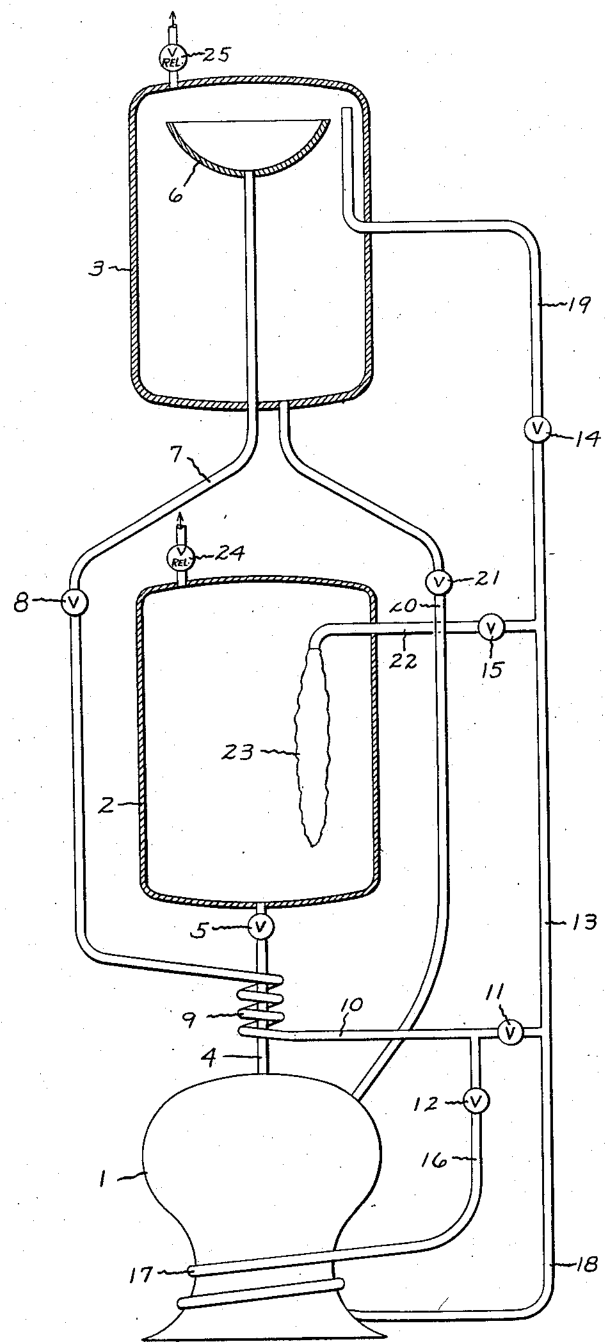
Inventor
Henry M. Mitchell
by Claude A. Mott
His Attorney United States Patent Office 2,701,441

Patented Feb. 8, 1955

2,701,441

PRESSURIZED FEED FOR JET PROPULSION SYSTEMS

Henry M. Mitchell, Schenectady, N. Y., assignor to General Electric Company, a corporation of New York Application January 18, 1950, Serial No. 139,230

1 Claim. (Cl. 60—35.6)

This invention relates to a jet propulsion system. More particularly, it relates to an improved means of pressurizing the propellants in a jet propulsion system.

Heretofore, a number of methods for pressurizing the propellants to provide a forced feed to the combustion chamber of a jet propulsion system have been suggested. One of the methods entails the use of propellant pumps which are actuated by a gas turbine or other prime mover. While this method of pressurizing the propellants is feasible, the weight and bulk taken up by the pumps and the prime mover are such as to detract seriously from the weight and space devoted to the propellants themselves and the payload. This is especially true in the case of smaller missiles. Being mechanical in nature and involving a complicated driving mechanism, the pumping system is also subject to mechanical failures unless precautions are taken in its design to insure its operation under dynamic forces of high magnitude.

Another method of pressurizing the propellants is by means of a separate high pressure tank. This tank usually contains an inert gas such as nitrogen and is connected through valves to the propellant tanks so that the inert gas may force the propellants into the combustion chamber. A major disadvantage of this type of pressurizing system is the heavy weight necessarily involved in the extra pressurizing tank which again reduces the amount of weight and space devoted to the propellants with a corresponding reduction in range, or of the payload.

An object of this invention is to provide an improved means of pressurizing the propellants in a jet propulsion system.

Another object of the present invention is to provide an improved means of pressurizing the propellants in a jet propulsion system in which a portion of the liquid oxygen propellant is gasified in a heat exchanger and is used to pressurize both the fuel and the oxygen propellants.

A further object of the present invention is to provide a propellant pressurizing means for a jet propulsion system which is light in weight and free of moving parts.

Other objects will become apparent from a consideration of the following description and the drawing in which the single figure shows the present pressurizing system as applied to a rocket propulsion system.

It has been found that a light weight, non-bulky and simple propellant pressurizing system may be provided by heating a part of the oxygen propellant in a heat exchanger and using the resultant gas as a pressurizing medium.

In accomplishing the purpose of the present invention, a portion of the liquid oxygen which is stored in the liquid oxygen propellant tank is led through a heat exchanger located in a relatively warmer part of the system, for example, around the conduit leading from the fuel propellant tank to the combustion chamber. If the gaseous oxygen formed in this exchanger is not at a high enough temperature, the gas may be passed through a second stage heat exchanger or superheater contiguous to the combustion chamber or its exit duct. Any desired system of regulating valves may be provided in the gaseous oxygen line leading to the propellant tanks to control the pressure in the system and in each of the tanks. Relief valves may also be provided at different points to relieve excessive pressures in various parts of the system. While the gaseous oxygen may be led directly into the liquid oxygen tank to pressurize the latter, it is preferable that the gaseous oxygen does not come into contact with the fuel propellant. This may be accomplished in any of a number of ways. For example, the high pressure gaseous oxygen may be used to inflate an impervious bag within the fuel tank and thus pressurize the fuel to the desired degree. The gaseous oxygen may also be led into the fuel tank above a piston fitted in the tank as a cylinder which is moved by the gaseous pressure against the fuel to force the latter into the combustor. Other means of accomplishing the above purpose will occur to those skilled in the art.

For a more complete understanding of the present invention, reference is made to the drawing. While the drawing shows the present invention as applied to a rocket propulsion system, it is to be understood that a rocket system is chosen, not in a limiting sense, but merely as a typical example of a jet propulsion system. The system shown has a combustion chamber or combustor 1, and two propellant tanks, one being a fuel tank 2 and the other an oxygen or oxidizer tank 3. The present rocket system being in the simplest form for purposes of clarity, conduit 4 is shown as leading directly from the fuel tank to the combustion chamber 1, though it could be led first about the combustor 1 to provide regenerative cooling of the chamber walls. In order to control the flow of fuel from its reservoir or tank 2 to the combustor 1, regulating valve 5 is provided in line 4 as shown or alternatively between heat exchanger 9 and combustor 1. Mounted in liquid oxygen tank 3 is a receptacle 6 which becomes filled with liquid oxygen as tank 3 is filled. Other means of accomplishing this same purpose will occur to those skilled in the art, there being illustrated only one practical means of accomplishing this purpose. Where the extra head afforded by flow from receptacle 6 is not necessary, or to simplify the apparatus, conduit 7 may lead directly from the bottom of tank 3.

In order to convert the liquid oxygen to the gaseous state with a corresponding increase in volume, conduit 7 is led through a heat exchanger 9, located about fuel conduit 4, and represented by a simple helical arrangement of conduit 7 about conduit 4. The fuel in conduit 4 being at a much higher temperature than the liquid oxygen in conduit 7, the liquid oxygen is heated and converted to the gaseous form in which its volume is increased. If the volume of the oxygen in conduit 10 after it has left the heat exchanger 9 is sufficiently high to pressurize the propellants, it may be led directly through valve 11, valve 12 being closed, into line 13 and thence to oxygen tank 3 and fuel tank 2 through pressure regulating valves 14 and 15 respectively. On the other hand, if a greater volume is necessary or desirable, valve 11 may be closed, valve 12 opened and the gaseous oxygen led through conduit 16 to another heat exchanger 17 for further heating and increase in volume. Heat exchanger 17, shown schematically in the form of coils, may be located at any convenient place where it can be heated by the combustion process. The installation shown about the nozzle of combustor 1 is illustrative only. Gaseous oxygen is led from heat exchanger 17 through conduit 18 to its juncture with conduit 13 whence its flow is as described above.

In pressurizing the liquid oxygen in tank 3, the gaseous oxygen may be introduced into the tank through line 19 which passes through the wall of the tank and terminates near the top of the tank. If desired, an insulating medium may be floated on the surface of the liquid oxygen to prevent contact of the pressurizing oxygen and the liquid oxygen. Such an arrangement conserves the gaseous oxygen by reducing condensation upon contact with the colder liquid form. The pressurized oxygen is then force fed through conduit 20 and regulating valve 21 to the combustor 1.

In order to prevent the liquid oxygen led into tank 2 to pressurize the latter from mixing with the fuel therein, conduit 22 preferably terminates in an arrangement such as that shown at 23. The pressurizing oxygen controlled by valve 15 enters inflatable bag 23 which, in filling and expanding, takes up an increasing amount of space in tank 2 and pressurizes the fuel therein. The bag should, of course, be made of material which will not be dissolved by the fuel such as gasoline or alcohol. Other suitable means of transmitting the pressure of the gaseous oxygen to the fuel will occur to those skilled in the art though emphasis should be placed on making it light in weight.

If the distance between the bottom of tank 3 and heat exchanger 9 is sufficiently large to provide a good head for the flow of liquid oxygen from the tank to the exchanger, receptacle 6 may be omitted.

In case the pressures within the propellant tanks become excessive or unsafe, pressure relief valves 24 and 25, set to operate at the maximum permissible pressure, are provided as shown.

In operation the propellant tanks are filled, the filling of the oxygen tank also filling receptacle 6 with liquid oxygen. The propellant tanks may be pressurized before or after the jet propulsion system has been placed in operation. In pressurizing the tanks, liquid oxygen flows through heat exchanger 9 where it is gasified and increases in volume, thence to the tanks through suitable valving arrangements, or through another heat exchanger 17 which further increases the volume. The gaseous oxygen is led above the oxygen where its pressure acts to force feed the liquid oxygen to the combustor. In pressurizing the fuel, the gaseous oxygen is preferably used to fill an inflatable bag which, in taking up space within tank 2 as it inflates, forces the fuel from the tank when the conduit is opened.

While the oxidizing propellant has been referred to as oxygen, such term is intended to include all gasifiable materials which are capable of furnishing oxygen for the combustion of the fuel propellant.

What I claim as new and desire to secure by Letters Patent of the United States is:

A pressurized feed system for a jet propulsion system, having tanks for liquid fuel and oxygen propellants and a combustor, comprising conduits leading from the fuel and oxygen tanks to the combustor, a first heat exchanger for exchanging heat with the conduit leading from the fuel tank to the combustor, a second heat exchanger for exchanging heat with the combustor, an inflatable bag in the fuel tank, a conduit leading from the oxygen tank through said first heat exchanger and through a first valve to said inflatable bag and back to said oxygen tank, a by-pass conduit by-passing said first valve and leading from the first heat exchanger through a second valve and said second heat exchanger to said inflatable bag, whereby by controlling said first and second valves the oxygen tank may be selectively connected to said first heat exchanger alone or to both the first and second heat exchangers, and additional valve means for controlling the flow of propellants within said conduits.

References Cited in the file of this patent

UNITED STATES PATENTS

| | | |
|---|---|---|
| 588,293 | Reeve | Aug. 17, 1897 |
| 1,860,891 | Goddard | May 31, 1932 |
| 2,395,113 | Goddard | Feb. 19, 1946 |
| 2,505,798 | Skinner | May 2, 1950 |
| 2,576,984 | Wildhack | Dec. 4, 1951 |

OTHER REFERENCES

"Astronautics" (No. 34), pages 8, 9, 10, June 1936.